United States Patent

Mahy et al.

[11] Patent Number: 6,161,809
[45] Date of Patent: Dec. 19, 2000

[54] TILT-ADJUSTABLE SUPPORTING DEVICE, IN PARTICULAR MAINTAINED IN A HORIZONTAL POSITION

[76] Inventors: Laurent Mahy, 51, Rue du Chemin-de-Fer, Ezanville, France, F-95460; Félix Touret, 14, avenue du Général-de-Gaulle, Vincennes, France, F-94300

[21] Appl. No.: 09/081,938

[22] Filed: May 21, 1998

Related U.S. Application Data

[63] Continuation-in-part of application No. PCT/FR96/01677, Oct. 25, 1996.

[51] Int. Cl.⁷ ..................................................... A45D 19/04
[52] U.S. Cl. ........................ 248/396; 248/163.1; 248/421; 248/371; 108/4
[58] Field of Search ....................................... 248/393, 394, 248/395, 396, 397, 178.1, 183.1, 371, 354.3, 180.1, 184.1, 161, 421, 163.1; 108/137, 141, 1, 4; 5/611; 473/279

[56] References Cited

U.S. PATENT DOCUMENTS

| | | |
|---|---|---|
| 3,215,391 | 11/1965 | Storm ...................................... 248/396 |
| 3,288,421 | 11/1966 | Peterson ................................... 248/396 |
| 3,374,977 | 3/1968 | Moy ...................................... 248/163.1 |
| 3,658,286 | 4/1972 | Terai ....................................... 248/371 |
| 4,360,182 | 11/1982 | Titus ....................................... 248/371 |
| 4,370,813 | 2/1983 | Burniski ................................... 33/291 |
| 5,340,111 | 8/1994 | Froelich ............................. 473/279 X |
| 5,358,251 | 10/1994 | Ashton ................................... 473/279 |
| 5,431,406 | 7/1995 | Ishii ................................... 273/195 B |
| 5,549,522 | 8/1996 | Chang ..................................... 473/279 |

FOREIGN PATENT DOCUMENTS

| | | |
|---|---|---|
| 0 127 895 | 6/1984 | European Pat. Off. . |
| 23 45 894 | 3/1998 | Germany . |
| 2 250 109 | 5/1992 | United Kingdom . |

*Primary Examiner*—Ramon O. Ramirez
*Assistant Examiner*—Gwendolyn Baxter
*Attorney, Agent, or Firm*—Fisher, Christen & Sabol

[57] ABSTRACT

A support device comprising two superposed platforms connected by two electrically controlled jacks of adjustable length and by an upright of constant length forming on these platforms the apices of triangles, device characterized in that the jacks and the upright are rigidly fixed on one of the platforms, so-called upper platform, by an articulation assembly comprising a universal joint and a pivot pin, each pivot pin being located parallel to the opposite side of the triangle defined on this platform.

10 Claims, 4 Drawing Sheets

TILT-ADJUSTABLE SUPPORTING DEVICE, IN PARTICULAR MAINTAINED IN A HORIZONTAL POSITION

This is a continuation-in-part of International Application No. PCT/FR96/01677, filed on Oct. 25 1996.

FIELD OF THE INVENTION

The present invention relates to a support device with adjustable inclination and in particular with maintenance of its horizontality.

BACKGROUND

British Patent Application No. 2,259,109 already discloses a device of this type which comprises a lower platform and an upper platform connected by two jacks and an upright of constant length, together defining a triangle. In this arrangement, the jacks and the upright are connected by a ball-and-socket joint at its lower end and a pivot pin at its upper end.

However, this known arrangement presents various drawbacks, the principal ones concerning the positioning clearances which, while being small, are too great to ensure a precise and stable positioning of a camera. In addition, this known device, which only allows its horizontality to be maintained or re-established, is of complicated construction, while the arrangement of the jacks and upright connected in articulated manner to the platforms does not allow an easy implantation of the inclinometers and the electronic circuits and thereafter sufficient free room for fixing the support on the underframe and for fixing a camera on this support.

It is an object of the present invention to overcome these drawbacks.

SUMMARY OF THE INVENTION

To that end, it relates to a support device of the above-mentioned type, characterized in that the jacks and the upright are rigidly fixed on one of the platforms, so-called lower platform, and are connected to the other platforms, so-called lower platform, and are connected to the other platfonn, so-called upper platform, by an articulation assembly comprising a universal joint and a pivot pin, each pivot pin being located parallel to the opposite side of the triangle defined on this platform.

According to another feature of the invention, the three universal joint/pivot in articulation assemblies are identical.

According to another feature of the invention, the universal joints are disposed towards the end of the jacks and upright, while the pivot this are disposed towards the upper platform.

According to another feature of the invention, the device comprises two double inclinometers each disposed in the supply circuit of one of the jacks, this circuit comprising a gravity-sensitive contactor assembly adapted to ensure adjustment of the inclination of the device in its normal or upturned position.

According to another feature of the invention, the jacks comprise manual means for mechanically adjusting their length.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
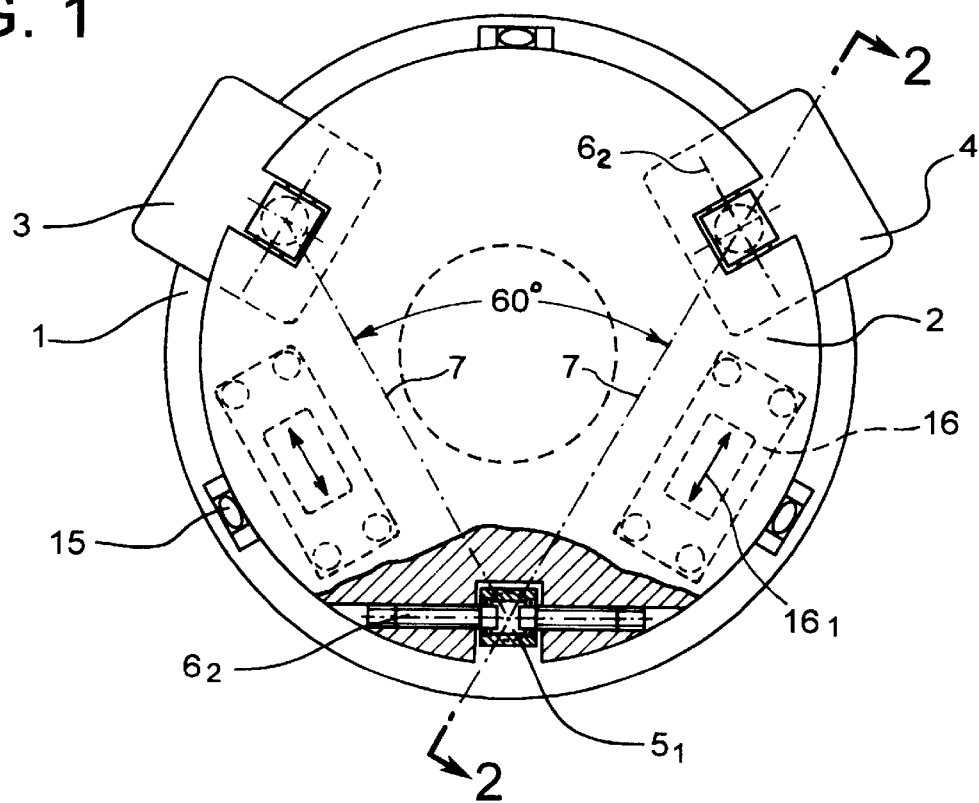
FIG. 1 is a plan view of the device according to the invention, partially in section.

The present invention consequently has for its object a support device whose inclination is adjustable and which may be usefully employed for supporting a camera. To that end, this support device presents a zero clearance in the three directions in space.

This device is also simple to construct and may be used either in normal position or in upturned position, the inclination being adjustable in both directions, either manually or automatically. In the latter case of automatic adjustment, the device maintains horizontality of the support with respect to the ground.

Referring now to the drawings, the device comprises a lower platform 1 and an upper platform 2 which are connected by two electric jacks 3 and 4 and by an upright 5 of constant length.

These jacks and upright 3, 4 and 5 together define a triangle, preferably an equilateral triangle, and are rigidly fixed, perpendicularly, to the lower platform, while they are connected to the upper platform by three articulation assemblies 6.

These articulation assemblies, which are identical, comprise a universal joint $6_1$ and a pivot pin $6_2$. The universal joint $6_1$ is supported by one end $3_1$, $4_1$ (not shown) of the jacks and $5_1$ of the upright, while the pivot pins $6_2$ are mounted on the upper platform 2 and define the apices of the triangular structure mentioned above. These pins $6_2$ are each disposed parallel to the opposite side 7 of this triangular arrangement.

Figure 2:
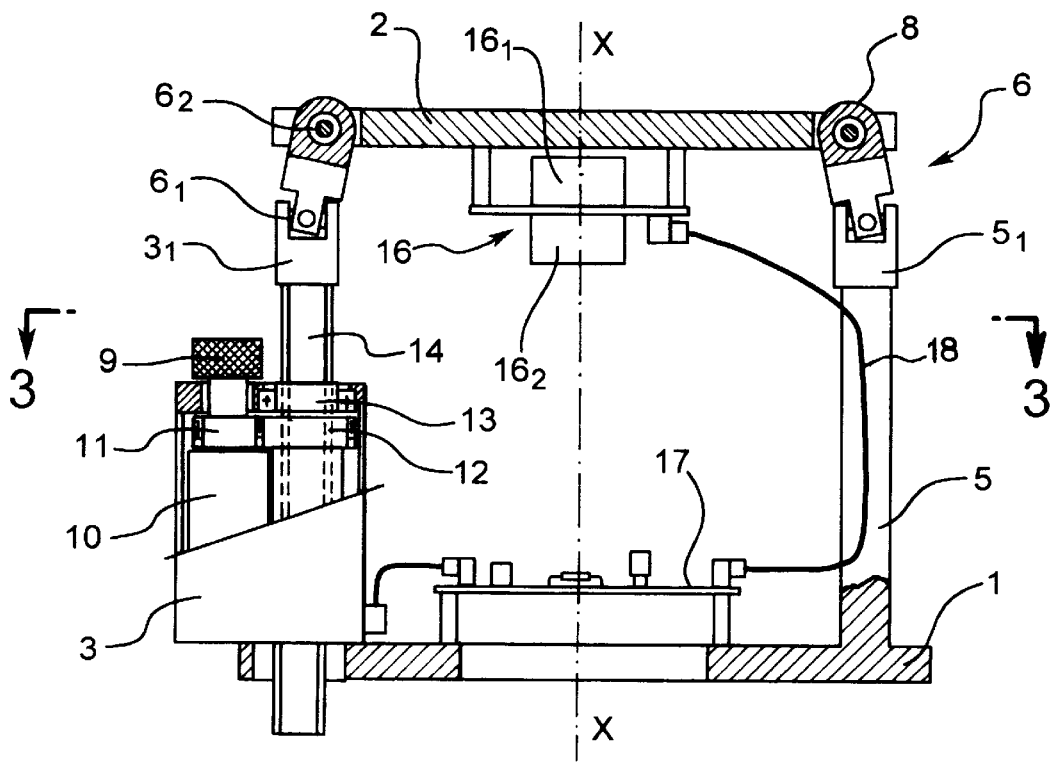
FIG. 2 is a section along A—A of FIG. 1.

Furthermore, the pivot pins $6_2$ are disposed with respect to the universal joint $6_1$ so that the components 8 which connect the pins to the universal joints are inclined by an angle α with respect to the vertical axis x of the device (cf. FIG. 2). The components present, for example, a width of 20 to 50 mm. In a variant embodiment, the angle α is equal to 0°.

All these arrangements which locate the articulation assemblies in the immediate proximity of the upper platform, while the jacks and uprights are rigidly fixed to the lower platform, make it possible to reduce the clearances of the upper platform 2 with respect to the lower platform 1 in the three directions in space.

This result is also obtained by employing universal joints which therefore allow a displacement in all directions in space but without rotation.

Furthermore, this arrangement makes it possible to reduce congestion within the volume defined by the two platforms in order to facilitate implantation of the mechanisms ensuring operation of the support device, as well as the mechanisms supporting or supported by this device.

Manual adjustment of the inclination of the upper platform 2 or automatic adjustment to maintain its horizontality is obtained by the electric jacks 2 which comprise a manual adjustment knob 9 disengageable from the motorization disposed on the driven shaft of the gear motor 10, this shaft also comprising a gear wheel 11 which meshes with a second gear wheel 12 fast with a nut 13 engaged on the threaded rod 14 maintained fixed in rotation.

Manual rotation of the knob 9 or supply of the gear motor 10 therefore ensures displacement by axial translation of the threaded rods 14 further to the rotation of the nut 13.

Spirit levels 15, preferably three in number, are disposed on the periphery of the upper platform 2 between jacks 3, 4 and the upright 5 in order to facilitate vision of the horizontality, particularly when the adjustment is manual.

When operation of the support device is automatic and in order to maintain horizontality of the upper platform 2 in the case of its normal position and of the lower platform 1 in the case of its upturned position, two monoaxial, gravity-sensitive, double inclinometers 16 are provided, each disposed between a jack and the upright, the working axis 16' of these double inclinometers each being parallel to the adjacent side 7 of the triangular structure mentioned above.

Figure 6:
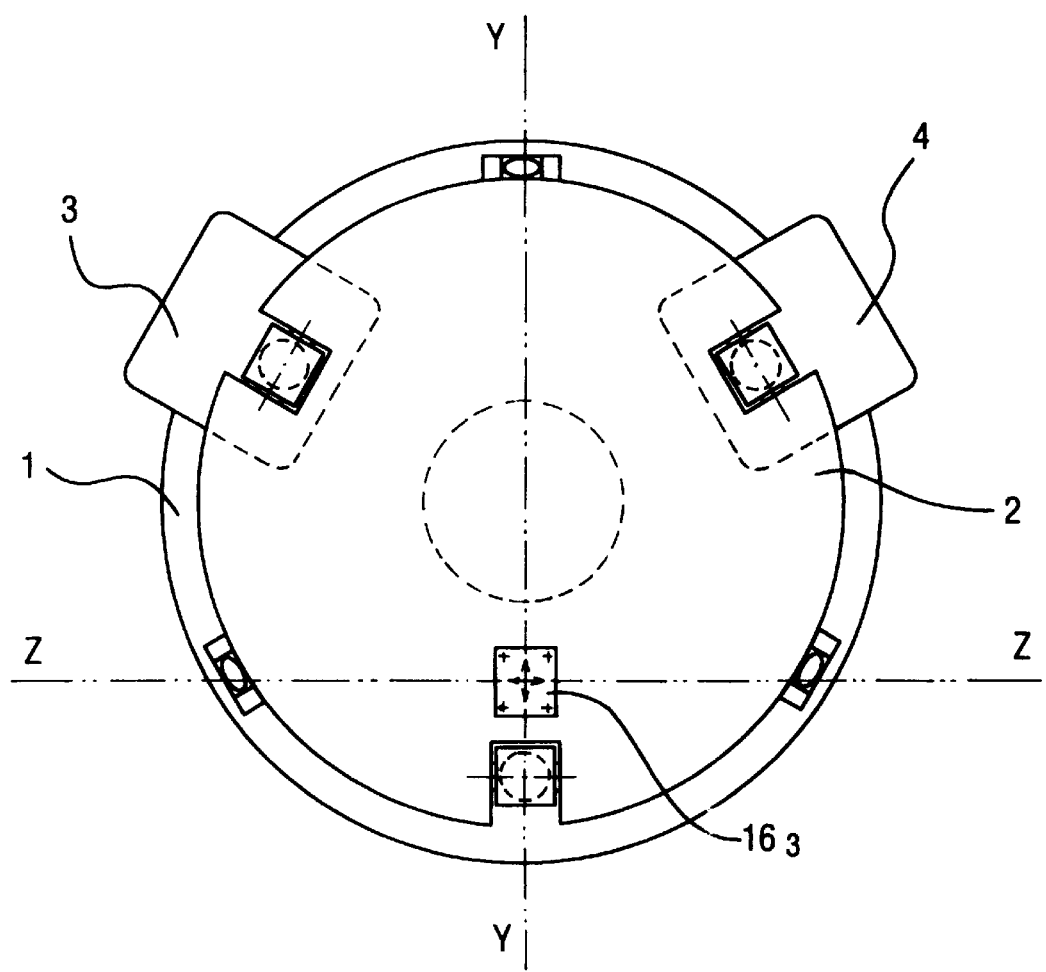
FIG. 6 is a plan view, partially in section, of another embodiment of the device according to the invention.

In a valiant embodiment of the invention (shown in FIG. 6), only one biaxial, gravity-sensitive, double inclinometer $16_3$, working at 90° along axes Y and Z, is provided. The inclinometer $16_3$ is disposed for example on axis Y, near the upright, and more precisely between the central orifice $1_1$ and said upright.

These double inclinometers which are fixed beneath tie lower face of the upper platform 2 each comprise two gravity-sensitive elements, known per se, which produce a signal as a function of the inclination by measuring the conductivity of a liquid by a magnetic stray field in order to determine firstly the level of filling then, in a differential mode, the angle of inclination.

Figure 3:
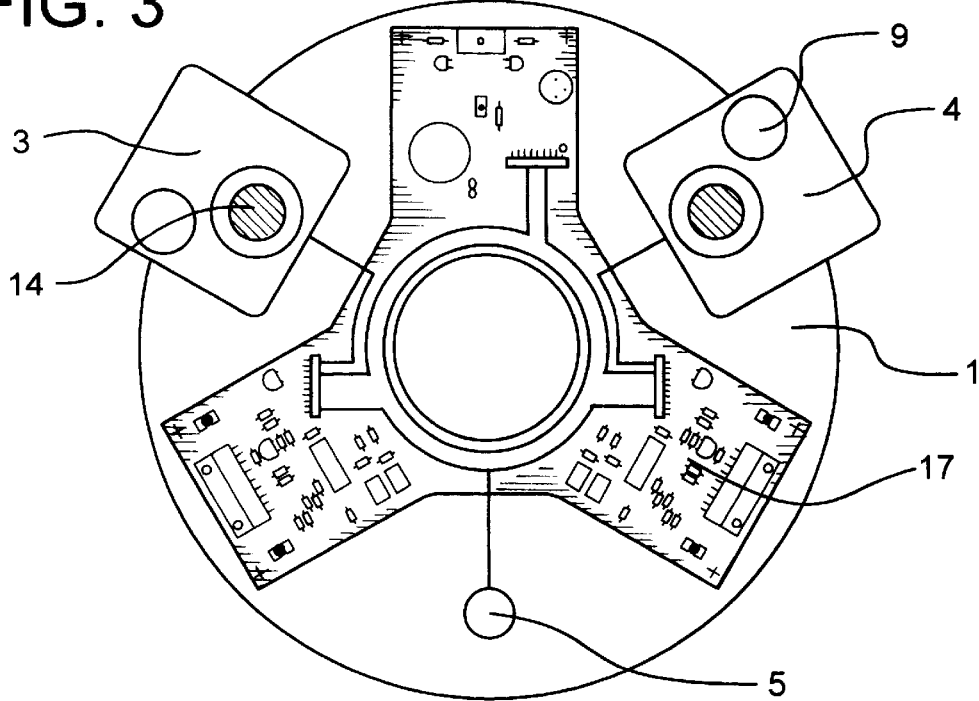
FIG. 3 is a section along B—B of FIG. 2.
Figure 4:
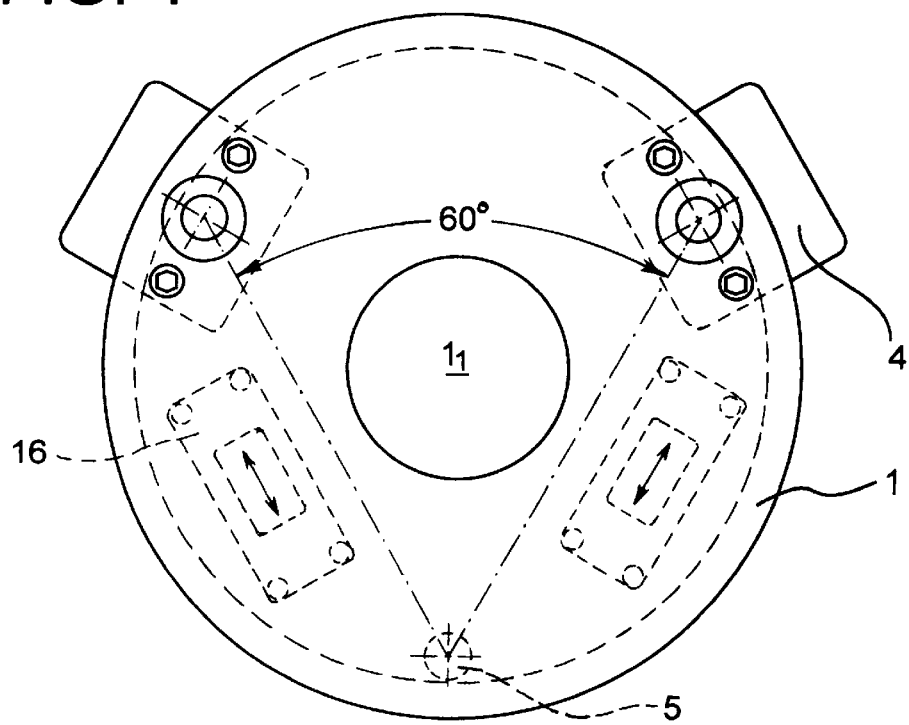
FIG. 4 is a view of the lower platform of the device, seen from underneath.

The electronic circuit controlling each of the jacks 3 from one of the double inclinometers 16 is fixed on the upper face of the lower platfonn 1 via a printed circuit 17 and occupies a triangular or central arrangement between jacks 3, 4 and the upright 5 (cf. FIG. 3) so as to effect a rational implantation mechanically protected in the bulk of the support device and freeing the central orifice $1_1$ of the lower platform 1 with the aid of which the support device is fixed for example on an underframe.

This circuit will preferably be supplied from batteries.

The electrical connections 18 between the double inclinometers 16 fixed beneath the upper platform 2 and the electronic circuit mounted on the printed circuit 17 fixed on the upper face of die lower platform 1, pass through the hollow fixed upright 5 so as to be suitably protected.

The electronic circuit for controlling each motor 10 of the jacks 3 and 4 from the inclinometers $16_1$ and $16_2$ of each double inclinometer 16, comprises a reversing contactor 19 functioning by gravity, preferably of the mercurial contact type, which is connected to each of the inclinometer elements $16_1$ and $16_2$ in order to place one of them in circuit depending on whether the support device occupies a normal position (the upper platform being disposed at the top), or an upturned position (the upper platform being disposed beneath the lower platform).

This circuit also comprises a reversing contactor 20 intended either to place the inclinometer elements $16_1$ and $16_2$ in circuit via the contactor 19 to ensure automatic maintenance of the horizontality of the support, or to place reversing contactors 21 and 22 in circuit in order to allow supply of the motor 10 of the jack concerned, either to ensure extension of the jack (contactor 21) or to ensure retraction thereof (contactor 22).

These contactors 21 and 22 are preferably constituted by push buttons.

When manual functioning is selected by the reverser 20, actuation of the push buttons 21 or 22 then supplies the motor 10 in one direction of rotation, or the opposite direction, via a motor control stage 23 and via a comparator 24.

When automatic functioning is selected by the reversing contactor 20, motor 10 is, in that case, supplied via the motor controller 23 and a window comparator 25 from one or the other of the inclinometers $16_1$, $16_2$.

These inclinometers are also connected to potentiometer devices 26 and 27 which adjust, on the one hand, the zero position, and, on the other hand, the sensitivity of the device.

The reference potentials of the comparators 24 and 25 are determined by a divider bridge comprising four resistors 28, 29, 30 and 31.

The device according to the invention therefore allows a manual and mechanical adjustment of the inclination by knobs 9, a manual and electric adjustment of the inclination by contactors 21 and 22, and an automatic adjustment, with maintenance of the horizontality, by the actuation of the reversing contactor 20.

Figure 5:
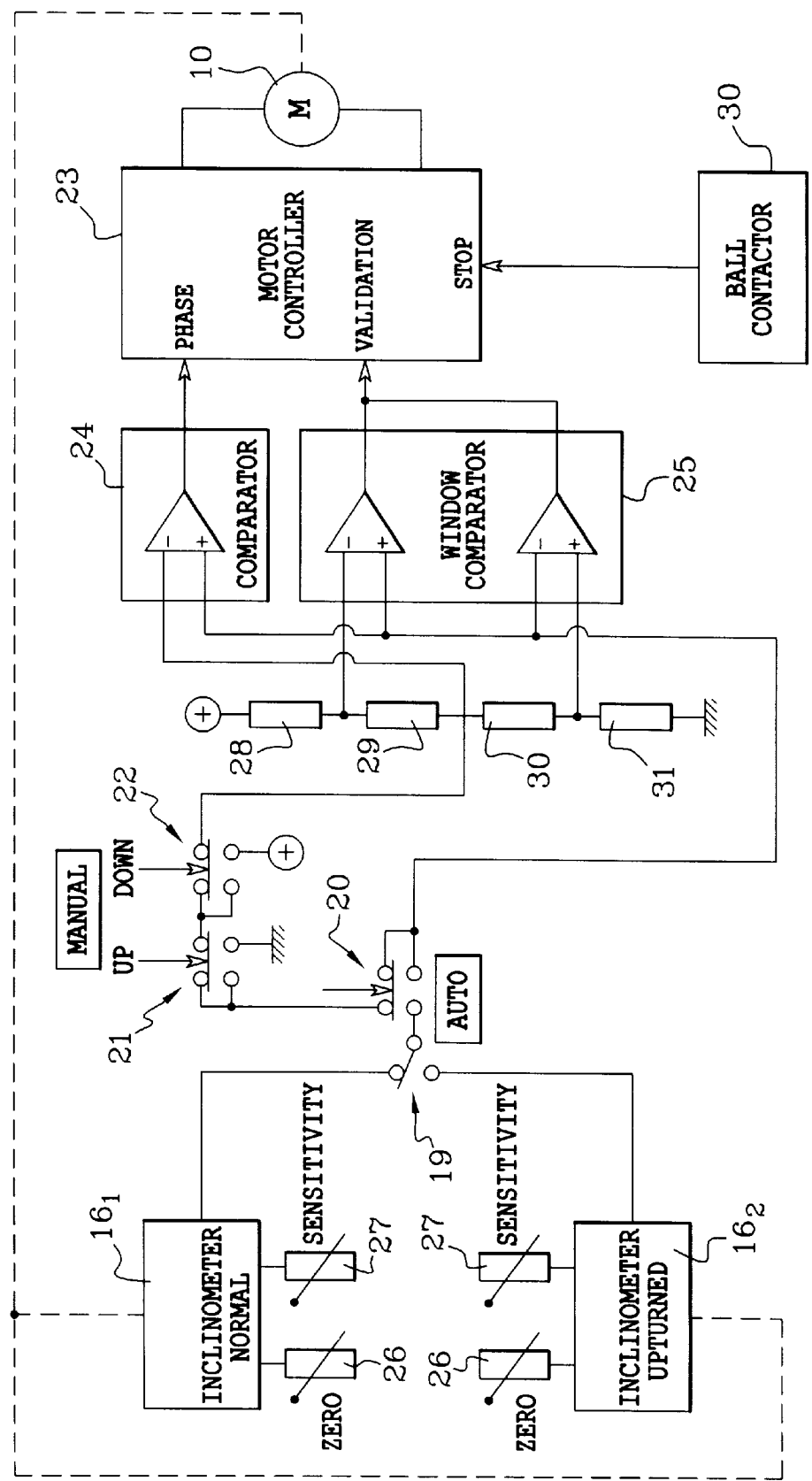
FIG. 5 is a block diagram of the supply of the motor of one of the electric jacks of the device.

The device according to the invention will also comprise a ball contactor shown schematically at 30 in FIG. 5, this ball contactor being intended to prevent supply of the motor 10 in one direction or in the other when the inclination of the upper platform with respect to the lower platform exceeds a determined value, for example ±10°, beyond which the jacks can no longer recover the horizontality.

In the present description, two jacks and one upright of constant length are provided. However, it will be readily appreciated that this upright may itself be constituted by a jack actuated manually and independently, which allows the distance between the two platforms to be adjusted.

What is claimed is:

1. Support device with adjustable inclination and in particular with maintenance of its horizontality, comprising two superposed platforms connected by two electrically controlled jacks of adjustable length and by an upright of constant length forming on these platforms apices of triangles, wherein the jacks and the upright are rigidly fixed on one of the platforms, said lower platform, and are connected to the other platform, said upper platform, by an articulation assembly comprising a universal joint and a pivot pin, each pivot pin being located parallel to the opposite side of the triangle defined on the upper platform, and, for each articulation assembly, either the universal joint or the pivot pin is mounted on the upper platform.

2. The device of claim 1 wherein the device comprises three universal joint/pivot pin articulation assemblies which are identical.

3. The device of claim 1 wherein the device comprises two double inclinometers, each disposed in a supply circuit of one of the jacks, this circuit comprising a gravity-sensitive contactor assembly adapted to ensure adjustment of the inclination of the device in the normal or upturned position of the device.

4. The device of claim 3, wherein the electronic circuit for supplying the jacks is fixed on the lower platform and is connected to the inclinometers, fixed on the upper platform, by conducting connections disposed inside the uptight of constant height.

5. The device of claim 1, wherein the jacks are controlled by an electronic circuit comprising a reversing contactor for switching the inclinometers on/off and inversely for switching off/on two contactors for directly supplying the jacks.

6. The device of claim 1, wherein the device comprises one sole biaxial, double inclinometer.

7. The device of claim 1, wherein the jacks comprise means for mechanically adjusting their length, manually.

8. The device of claim 1, wherein the electronic circuit for supplying the jacks is fixed on the upper face of the lower platform around a central orifice in this platform and between the jacks and the upright.

9. The device of claim 1, wherein the pivot pin and the universal joint of each articulation assembly are connected by a component, these component being inclined towards the axis X—X of the device.

10. The device of claim 1, wherein the pivot pin and the universal joint of each articulation assembly are connected by a component whose longitudinal direction is parallel to the axis X—X of the device.

* * * * *